United States Patent [19]

Bemba

[11] 4,180,090
[45] Dec. 25, 1979

[54] 4/2 WAY VALVE

[75] Inventor: Siegfried Bemba, Rommerskirchen, Fed. Rep. of Germany

[73] Assignee: De Limon Fluhme GmbH & Co., Düsseldorf, Fed. Rep. of Germany

[21] Appl. No.: 839,614

[22] Filed: Oct. 5, 1977

[30] Foreign Application Priority Data

Oct. 14, 1976 [DE] Fed. Rep. of Germany ....... 2646290

[51] Int. Cl.² ........................................... F16N 25/02
[52] U.S. Cl. .............................. 137/119; 137/624.14; 184/7 F; 222/249
[58] Field of Search .................... 137/119, 106, 624.11; 184/34, 32, 7 D, 7 E, 7 F; 222/249, 250

[56] References Cited

U.S. PATENT DOCUMENTS

2,794,518  6/1957  Pawling ............................ 184/7 F
3,390,943  7/1968  Myers ............................ 137/554 X

FOREIGN PATENT DOCUMENTS

1037783  8/1958  Fed. Rep. of Germany ........... 184/7 F

*Primary Examiner*—Alan Cohan
*Attorney, Agent, or Firm*—Martin A. Farber

[57] ABSTRACT

A pressure controlled 4/2 way valve, particularly for the alternating control of the feed conduits of two conduit - lubrication systems. Three cylindrical spaces are formed in a housing connected by channels with one another and each contain a piston for the automatic control of medium flowing therethrough. The pistons are each displaceable between two end positions, one piston functioning as a control piston, a second as an auxiliary control piston, and the third as a reception piston. One feed conduit is connected respectively on each side to the cylindrical space for the reception piston. A pressure relief valve for hydraulic precontrol is disposed in the flow path between a pressurized conduit connection and the cylindrical space for the reception piston.

14 Claims, 12 Drawing Figures

4/2 WAY VALVE

The invention relates to a pressure controlled 4/2 way valve, particularly for the alternate or reciprocal control of the feed conduits of two conduit—lubrication systems.

Central lubrication systems with two feed conduits preferably serve for the lubrication of machines and machine systems with a large number of friction places. They essentially comprise a pump, a 4/2 way valve which serves for reversing or changing over between the two feed conduits, the two feed conduits themselves, the distributors applied at the vicinity of the friction places, the friction place conduits leading to the friction places, a switching device on the conduit ends and an electrical or pneumatic control. The switching device serves the 4/2 way valve as an impulse generator or transmitter for the reversal or change-over, that is, it serves the pressure change in both of the feed conduits; this occurs in dependency on the differential pressure at the conduit ends. In particular, motor driven 4/2 way valves are used. It is disadvantageous in the manner that for the impulse production and transmission to the valve, electric switching or shifting devices are always required.

Further 4/2 way valves are used, which are driven directly by the feed pump and are hydraulically precontrolled or servo controlled by pressure at the beginning of the feed conduit. For this, indeed no electrical switching device is required, however the 4/2 way valve is fundamentally rigidly connected with the feed pump.

Further all 4/2 way valves have the disadvantage that the flow-through medium, particularly lubricant, is not consumed in the channels of the valves, but rather is shifted back and forth in dead spaces by the valve actuation. If with non-high grade grease, these grease columns remain under pressure over long periods of time, or (which still is to be considered more negatively) intermittent pressure changes are stopped, the oil found in the grease separates and the remaining soap and its structure, respectively, is inclined to the formation of a plug in the form of a solid mass. The plug or stopper then blocks the grease flow in the corresponding bores or channels and leads to failure of the 4/2 way valve.

The invention is based upon the task to avoid a connection of the 4/2 way valve with the feed pump and electrical switching devices and to make a 4/2 way valve which is hydraulically precontrolled by pressure in the feed conduits, and then automatically reverses dependent on the pressure in the feed conduit, whereby the grease columns and flow-through medium are shifted and consumed in the bores and channels with each working or control cycle, such that no dead spaces exist which would encourage failure of the valve.

It is another task and object of the present invention to aid the solution of the above-mentioned task, characterized by three cylindrical spaces (e.g., 47, 48, 49) connected by channels with one another formed in a housing (1), which spaces, respectively, each contain a piston (6, 7, 8) displaceable between two end positions, which pistons are for the automatic control of the flow-through medium, of which one operates as a control piston (8), a second as a precontrol piston (8) and the third as a reception or admission piston (6), whereby one feed conduit (I, II), respectively, is connected to the cylindrical space (47) of the reception piston (6) on both sides thereof, and in the flow path between a pressurized conduit connection (P) and the cylindrical space (47) of the reception piston there is arranged a pressure relief valve (9) for the hydraulic precontrol. In this manner a valve is produced which is hydraulically precontrolled by pressure in the feed conduit without electrical switching devices and without the necessity of a connection with the feed pump, and then automatically is reversed dependent on the pressure in the feed conduit.

Preferably between the feed conduits (I, II) and the pressurized conduit (P) and the relief or discharge conduit (R), respectively, the pistons (6, 7, 8) are arranged in the succession reception piston (6)/precontrol piston (7)/control piston (8), and the pistons (6, 7, 8) each have three annular spaces for connection of channels with one another, and on the face sides each piston has a step which leaves free a flow path through channels which are arranged there, also in the end positions. For consumption of the lubricant quantities which are found in the channels and bores, it is hereby particularly advantageous that additional channels are formed in the housing (1) between the cylindrical spaces (47, 48) of the reception piston (6) and of the auxiliary control piston (7) on the one hand and of the auxiliary control piston (7) and of the control piston (8) on the other hand, which additional channels have a connection to the depressurized relief discharge conduit (R). Consequently the flow-through medium flows through all control channels and annular grooves of the pistons with the reversal of the 4/2 way valve and prevents the medium in these channels and annular grooves from being only merely shifted back and forth, which would have the introductory mentioned disadvantage.

On the bases of a simple and symmetrical conduction of the channels it is advantageous to arrange the additional channels respectively such that the associated lubricant—supply channel is continued in the same plane diametrically opposite to the cylindrical space—face side, then is led back to the free face-sided cylindrical space in the piston—end position, is continued diametrically opposite thereto and opens in the cylindrical space of the cycle-wise interconnected piston, such that a cycle-wise connection is produced to the depressurized conduit in certain piston positions. Preferably a movement pointer projecting out from the housing can be fastened onto the control piston, which pointer actuates an end sensor key or limit switch, by which it monitors which feed conduit is admitted, or respectively, by this end sensor the lubricant supply to the pressure conduit can be switched off for the intermittent cycle course. The pistons can be metallically sealingly installed in the cylindrical spaces for the purpose of avoiding the use of additional seals.

In addition in accordance with the invention it is proposed to use the 4/2 way valve also in introduction—central lubrication systems. With such type of introduction systems, the system, including dosing distributors, is admitted under a predetermined pressure by a supply source and after attaining this pressure is again placed into the depressurized condition by means of reversing or change-over members, whereby after a predetermined pressure drop the dosing distributors can alternate and stand in readiness for the next lubrication cycle. Up to now such type of reversing members with automatic systems for control required either an electrical or a pneumatic switching or shifting arrangement or device. By the use of the 4/2 way valve in accordance with the present invention separate electrical or pneumatic switching or shifting devices, particularly with short pause times, are not required. It is merely necessary to provide either an additional piston between the feed conduit connections or an additional pressure accumulator. These two additional members respectively have the task of obtaining a pause time between two lubrications with their accumulator volumes to be varied with continuous operation, without requiring electrical or pneumatic switching or shifting devices therefor. With large systems the additional accumulator volumes can also be used for the timewise separation of two lubrication cycles. With these switching processes likewise all bores and channels between the individual pistons of the 4/2 way valve are always flown-through, so that no destruction of the lubricant occurs by pressure loadings.

For a further case of use it is proposed in accordance with the present invention to use the 4/2 way valve with automatic filling- and dosing-systems as a control element, for which purpose a regulatable dosing unit (43) is connected to one of the feed conduits (I, II), which dosing unit has a space (44) for the flow-through medium, a separation piston (45) and an adjustment device (46), whereby the later adjustably limits the stroke of the separation piston (45). Consequently in this case of use a simpler connection of the 4/2 way valve is possible with the feed conduit—outlets, whereby the control of the valve remains unchanged and the discharged dosed quantity can be supplied via the depresurizing conduit to the consumer. The filling- and dosing- times, for example, can be regulated by a throttle in the supply conduit. Likewise a control is possible by means of an end sensor key or limit switch.

With the above and other objects and advantages in view, the present invention will become more clearly understood in connection with the following detailed description of preferred embodiments, when considered with the accompanying drawings, of which:

Figure 1:
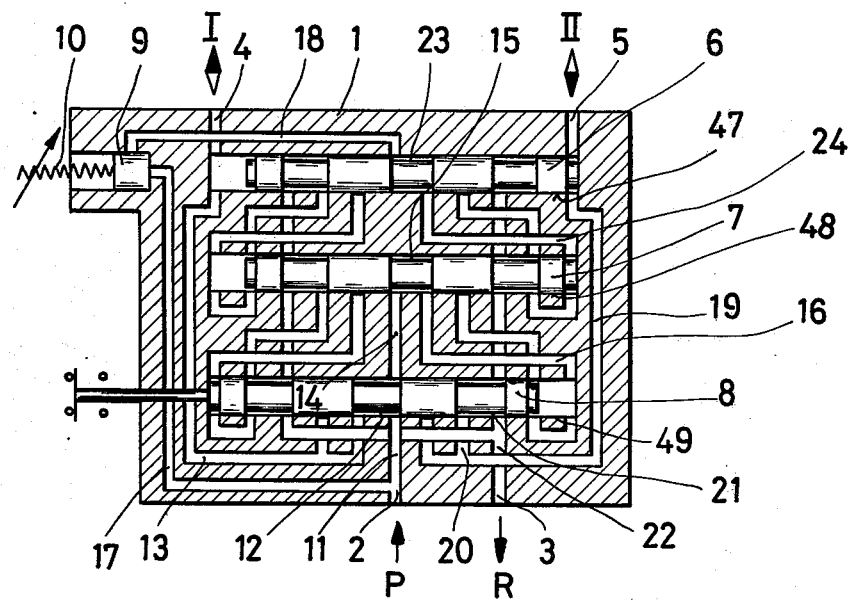
FIGS. 1, 2 and 3 are schematic flow circuit illustrations of a construction of a 4/2 way valve with the respective change-over phases by pressure build-up of a feed conduit I up to the pressure build-up of a feed conduit II for a two conduit—central lubrication system.
Figure 2:
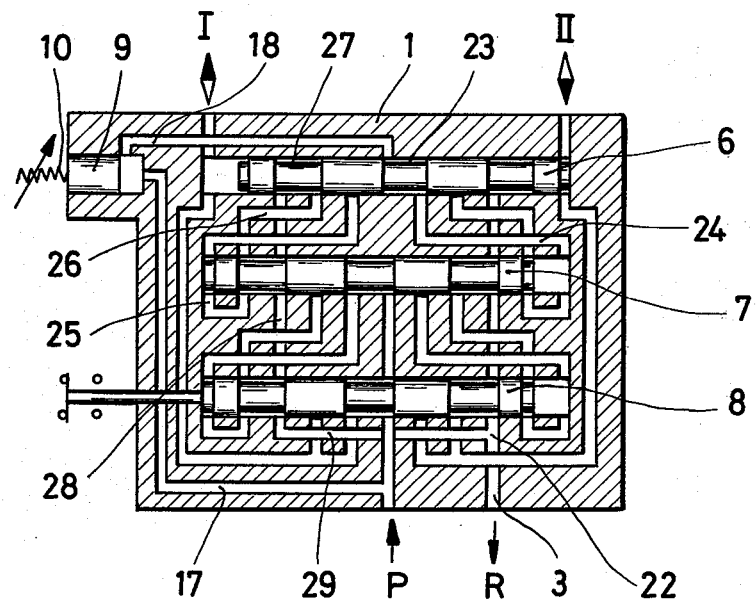
Figure 3:
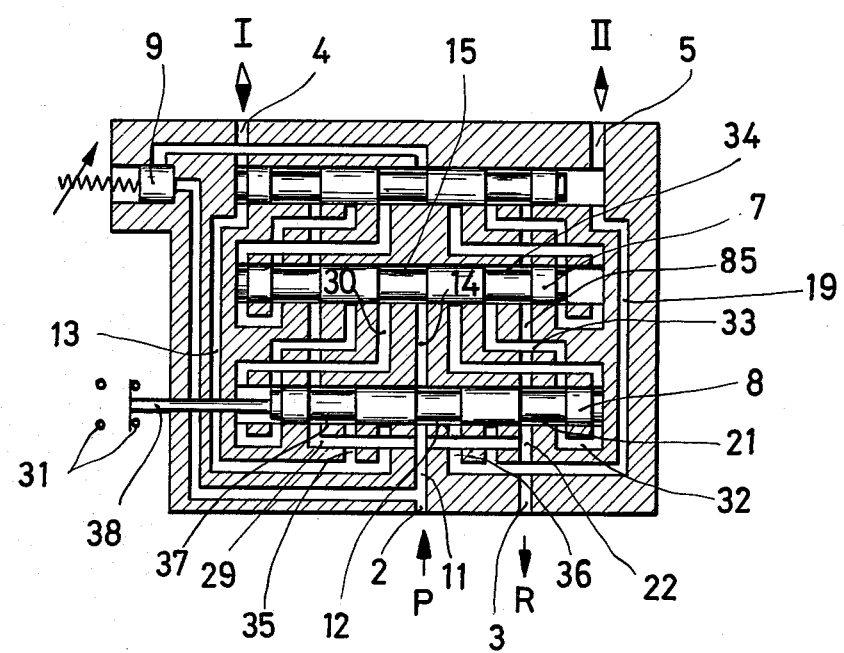

Referring now to the drawings, the 4/2 way valve illustrated in FIGS. 1 to 3 comprises a housing 1 with four connections, namely the pressure conduit connection P which leads into the channel 2, the return connection R which leads in the channel 3, the feed conduit connection I which leads into the channel 4 and the feed conduit connection II which leads into the channel 5. Three cylindrical spaces 47, 48 and 49 are formed parallel and spaced from one another in the housing 1, between the feed conduit connections I and II as well as the pressure conduit connection P and the return connection R arranged on the other side. The pistons 6, 7 and 8 are metallically sealingly arranged in the spaces 47, 48 and 49, respectively. The pistons are identical to one another and each have three annular spaces of smaller diameters and two steps on their face sides, which guarantee that even in the end position conditions of the pistons, housing channels which are connected to the face sides always remain in the flow-through condition. For this purpose the steps have a reduced diameter like the annular spaces.

Further, a pressure relief valve 9 is integrated in the housing. The pressure relief valve 9 is held in its closed position by means of an adjustable pressure or compression spring 10. Further, various bores and channels are formed in the housing, which are further set forth in the following on the basis of the functional and structural description of the 4/2 way valve.

The pressure conduit connection P is connected with a pressure source, for example a feed pump of the lubrication or greasing device. The lubricant flows from the pressurized conduit connection P through the channel 2 and the channel 11, which constitutes a continuation of the channel 2, into the cylindrical space 49. In the latter space the control piston 8 is disposed in its left end position, so that the lubricant flows through the annular space formed by the center annular groove 12 of the control piston 8. A channel 13 communicates with this annular space in this position of the control piston 8, which channel 13 is connected via the left face side end of the cylindrical space 47 with the feed conduit connection I via the channel 4. The reception or reply piston 6 which is arranged in the cylinder space 47 is pressed by the communicating pressure build-up in the feed conduit I into its right end position (FIG. 1).

Channel 2 extends into a channel 14 via the annular groove 12, which channel 14 opens into the cylindrical space 48. From there a channel 16 produces a connection to the right face side of the cylindrical space 49 which is illustrated in the drawings. As a result, the presure of the lubricant via the channel 14, the annular groove 15 of the precontrol or auxiliary control piston 7 and the channel 16 holds the control piston 8 in its left end position (FIG. 1).

Further a branch is connected to the channel 2, which via a channel 17 leads to the pressure relief valve 9 in the housing 1, which pressure relief valve is biased by a spring 10 into its closing position. The pressure relief valve 9 prevents the lubricant from flowing over from the channel 17 into the channel 18, the latter channel connecting the pressure relief valve 9 to the cylinder space 47 of the reception piston 6. In the right end position of the reception piston 6 illustrated in the drawing, a center annular groove 23 of this piston insures a connection with a channel 24, the latter being connected with the right face side of the cylinder space 48. The admission of this face side of the cylinder space 48 can be recognized in FIG. 2 of the drawings.

With the condition of the 4/2 way valve illustrated in FIG. 1 of the drawings, the feed line II can depressurize over the connection channel 5, a channel 19 which corresponds essentially to the previously described channel 13, a channel 20, an annular groove 21 of the control piston 8, a channel 22 and the return connection R via the channel 3 to the pressureless tank or compartment of the supply source (pump).

When the pressure in the feed line I increases further to an adjusted maximum pressure, the pressure in the channel 17 is increased and as illustrated in FIG. 2 opens the pressure relief valve 9 against the action of the spring 10. Lubricant then flows over the channel 18, the annular groove 23 of the reception piston 6 and the channel 24 behind the precontrol piston 7 and shifts the latter into its left end position. The displacement volumes of the precontrol piston 7 can escape at this moment via a channel 25, a channel 26, an annular groove 27 of the reception piston 6, channels 28 and 29, as well as the channel 3 and the return connection R. It may be recognized from the drawings that thus on the face sides the precontrol piston 7 and also (as further described below) the control piston 8 are provided with a continuous channel system in the housing 1, which, respectively from time to time via that piston which is cyclewise interconnected thereto, establishes a connection to the pressureless compartment of the lubrication device via the return connection R. This additional channel system which is significant for the function of the 4/2 valve, insofar as dead spaces are avoided, is symmetrically formed for the left as well as for the right end positions of the pistons in the housing 1. In this manner there is produced a compact, simply manufacturable construction type of the 4/2 way valve of the present invention.

By the shifting of the precontrol piston 7 the lubricant flows from the pressurized conduit connection P over the channel 2 through the channel 11, through the annular groove 12 of the control piston 8, the channel 14, the annular groove 15 of the precontrol piston 7 and an end channel 30 behind the control piston 8 and shifts the latter into its right end position (FIG. 3). In this manner a connection arises from the pressure conduit P over the channel 2, the channel 11, the annular groove 12, and the channels 19 and 5 for the feed conduit connection II, whereby during this phase the feed or delivery pressure at P (channel 2) collapses for a short time and the pressure relief valve 9 falls back into the starting position as shown in FIG. 3. The displaced volumes of the control piston 8 simultaneously can flow off via the end channels 32, 33, the annular groove 34, the channel 85, the annular groove 21, the channel 22 and the return connection R to the pressureless tank of the supply source.

In continuation of the position of the control piston 8, the feed line II is admitted with pressure and the feed line I can be depressurized via the channels 4, 13, 35, the annular groove 37, the channels 29 and 3 via the return connection R likewise to the pressureless compartment of the supply source.

As illustrated further in FIG. 3, by a movement pointer or indicator 38 which is secured to the control piston 8, an end sensor or key 31 is actuated, by which it can be visually monitored which of the feed conduits is admitted, and by which the lubricant feed or supply can be controlled for an intermittent cycle course.

After changing over or reversing from the feed line connection II to the feed line connection I, the change over process repeats in mirror-image sequence to the cycle illustrated in FIGS. 1, 2 and 3. Channels 16, 32 and 33 constitute one end channel communicating with the right face side end of the control piston 8 and the cylindrical space of the adjacent auxiliary piston 7.

Referring now again to the drawings, FIGS. 4–9 show a 4/2 way valve of the previously described type with an additional regulating piston 39 in the individual running phases during use as a control apparatus in an introduction—central lubricating device. In detail according to FIG. 4 additionally a delay or retardation unit is coordinated to the 4/2 way valve, which retardation unit comprises a regulating piston 39 and a dosing space 40. The retardation unit is connected between the previous feed conduit connections I (channel 4) and II (channel 5), whereby the feed conduit connection I is closed toward the outside by a stopper 41.

Figure 4:
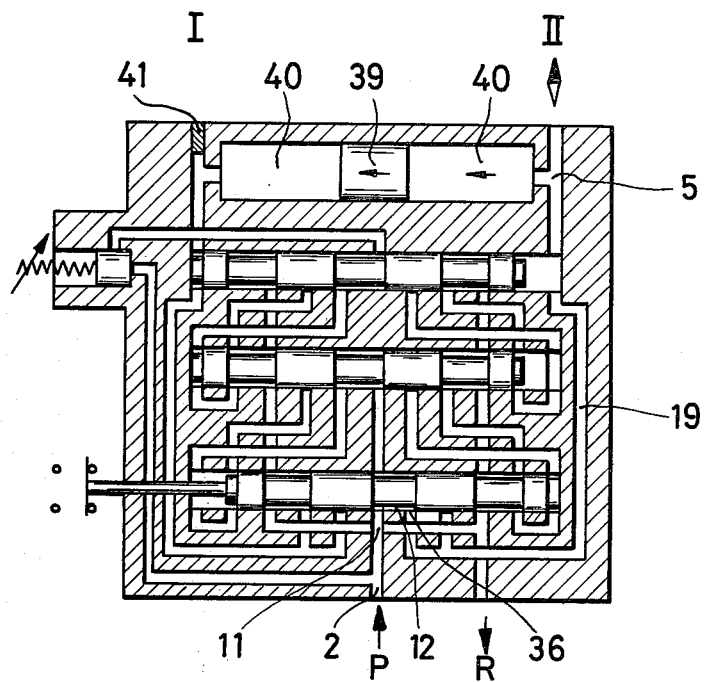
FIGS. 4-9 are schematic construction views of the 4/2 way valve of FIGS. 1-3 with an additional regulating piston in connection with an introduction—central lubrication system during a depresurizing- and pressurized- retard cycle.

As a functional picture FIG. 4 shows one phase in which a pressure build-up cycle is illustrated. In this manner the lubricant is fed from the pressure connection conduit P into the channel 2, via the channel 11, the annular groove 12, the channel 36, the channel 19 and the channel 5 to the feed conduit connection II and is led into the not illustrated feed conduit to the connected distributors. Likewise during this phase the regulating piston 39 is shifted into its left end position and the thereby displaced volumes are fed via corresponding channels to the return flow connection R.

Figure 5:
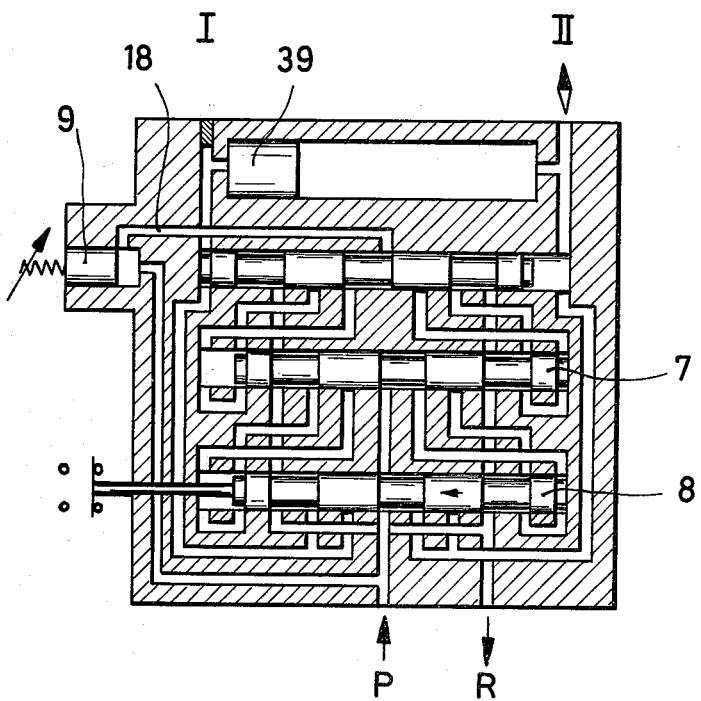

The continuation of the pressure build-up is shown in FIG. 5. In this phase the regulating piston 39 shifted into its left end position and the pressure has attained its maximum preselected level. In this manner the pressure relief valve 9 opens and via the channel 18 and the continuation channels, shifts the precontrol piston 7 into the right end position and the control piston 8 into the left end position (see arrow in the drawing).

Figure 6:
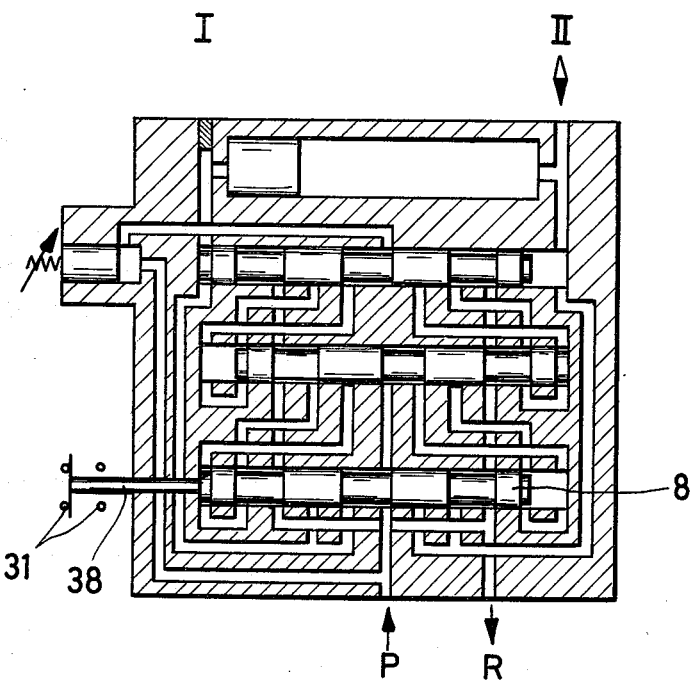
Figure 7:
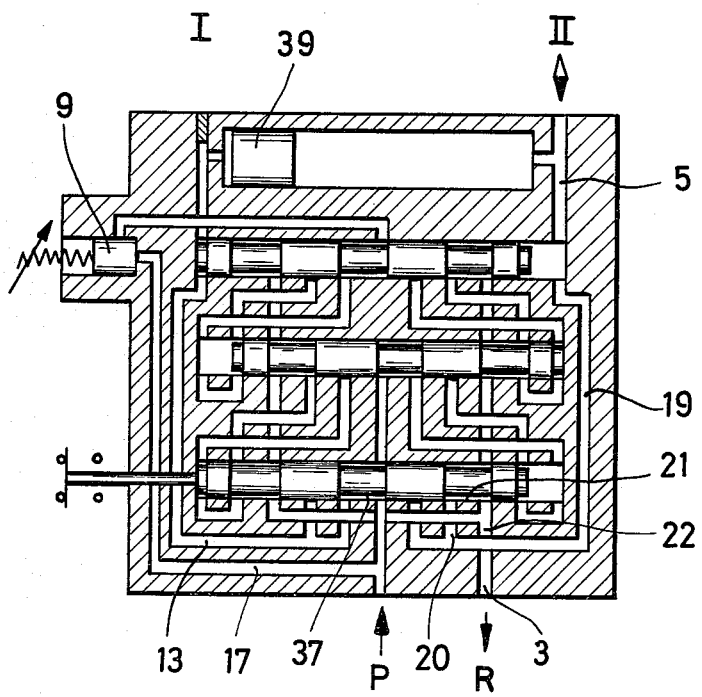

By shifting the control piston 8 according to FIG. 6 of the drawings, by the movement pointer 38 which is rigidly applied to the control piston 8, the end sensor 31 is actuated and the pressurized feed and quantity feed to the pressurized conduit connection P is switched off. During this switching-off, the pressure in the device collapses and can (as may be recognized in FIG. 7 of the drawings) depressurized via the annular groove 37 and the channel 13 on the regulating piston 39, whereby simultaneously also the pressure relief valve 9 can return into its starting position and the displaced volumes can likewise be received via the channel 17 by displacement of the regulating piston 39.

In this disconnection or switched-off phase, now the feed conduit which is connected to the feed conduit connection II can be depressurized via the channels 5, 19, 20, the annular groove 21, the channels 22 and 3 and the return connection R, so that the distributors which are built into the system, corresponding to their function, can rearrange and stand ready for the next lubrication cycle.

Figure 8:
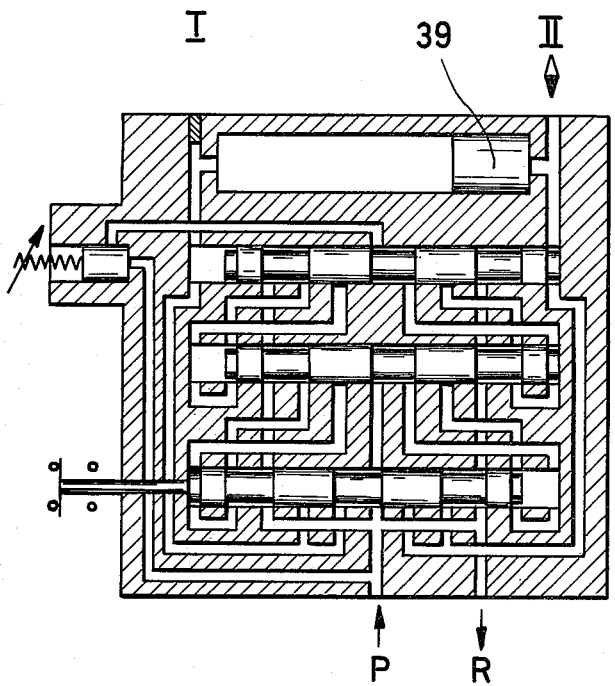
Figure 9:
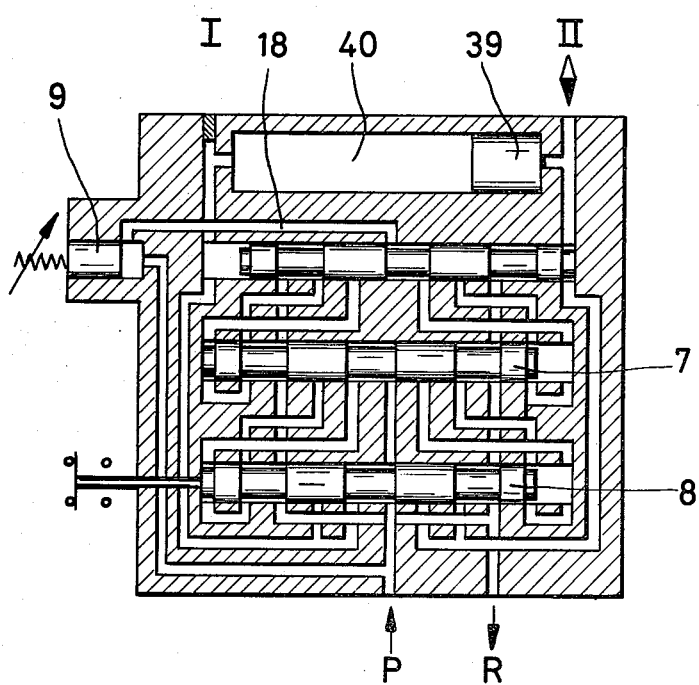

In FIG. 8 a new switched-on cycle is illustrated, by which it may be particularly recognized, that the regulating piston 39 must first travel into its right position and the displaced volumes likewise are still fed to the return connection R. Only upon reaching the right end position of the regulating piston 39 can a higher pressure set in, which as FIG. 9 shows opens the pressure relief valve 9, so that then, communicating via the channel 18 the pistons 7 and 8 can be brought into another position and a new lubrication cycle, as illustrated in FIG. 4, can originate.

The displacement of the regulating piston 39 up to the next pressure build-up means a certain time delay, which is sufficient with a continuous lubricating course, in order to guarantee the required depressurizing time. Thereby the dosing space 40 can be spaced differently with the corresponding regulating piston 39, and the piston stroke for different stroke lengths can have an adjustable abutment or limit stop (not illustrated).

Figure 10:
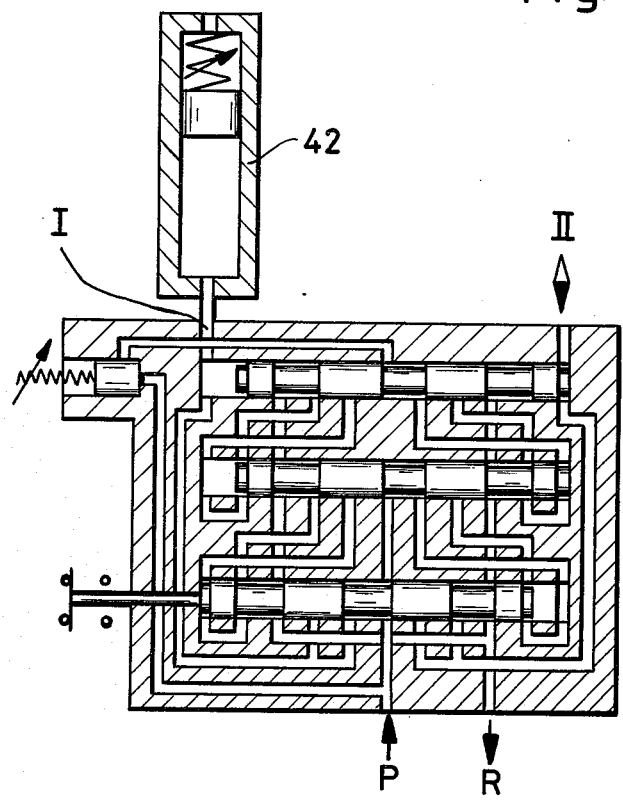
FIG. 10 is a schematic illustration of the construction of a 4/2 way valve of FIGS. 1-3 with an additional pressure accumulator in connection with an introduction—central lubrication system.

FIG. 10 of the drawings shows a further embodiment of the 4/2 way valve in connection with a use of an introduction—central lubrication system, whereby instead of the dosing space 40 and the regulating piston 39 of the previously described embodiment, a pressure accumulator 42 with a spring-biased piston is coordinated to the valve. The control-course and way-(path) course hereby are identical with the description of FIGS. 4–9.

Figure 11:
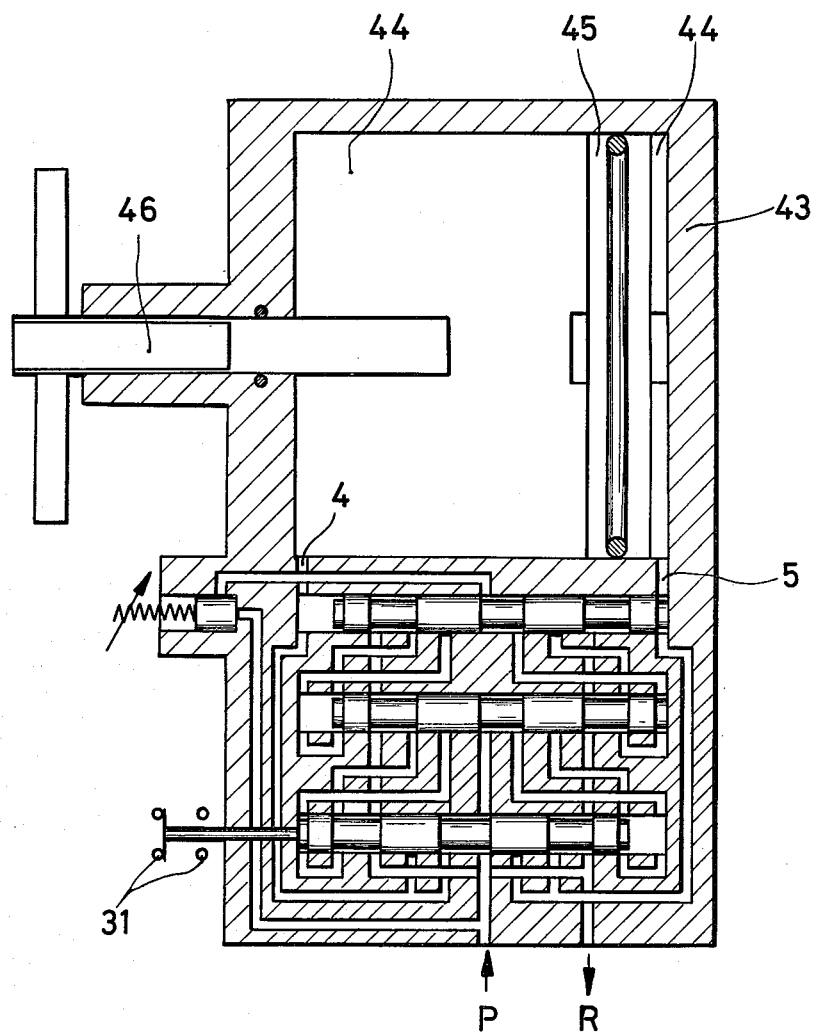
FIG. 11 is a schematic view of the construction view of a 4/2 way valve of FIGS. 1-3 in connection with a filling- or dosing- device.

FIG. 11 of the drawings shows a 4/2 way valve according to FIGS. 1–3, to which in a simple manner there is coordinated a regulatable dosing unit 43 for the automatic filling- or dosing- system. The dosing unit 43, which also as a separate part can be connected with the channels 4 and 5 of the 4/2 way valve, possesses a dosing- or filling- space 44, a separation piston 45 disposed therein and a setting or adjusting device 46. The dosing quantity which is discharged depends on or conforms to the stroke of the separating piston 45, which can be limited by the adjustment device 46.

The filing of the left or right dosing- or filling- space 44 is controlled by the 4/2 way valve, whereby the course of the control is identical to the function described according to FIGS. 1–3. The dosing quantity which is discharged accordingly from time to time from the left- and right- sided dosing- or filling- space 44 is at the return connection R and can be fed from here to the consumer.

With a continuous operation, that is a steady or permanent lubrication feed at P, the filing- and dosing- times, for example can be regulated by a choke or throttle in the supply conduit after P. On the other hand to the contrary the end sensor key 31 can be used with intermittent operation for the control.

Figure 12:
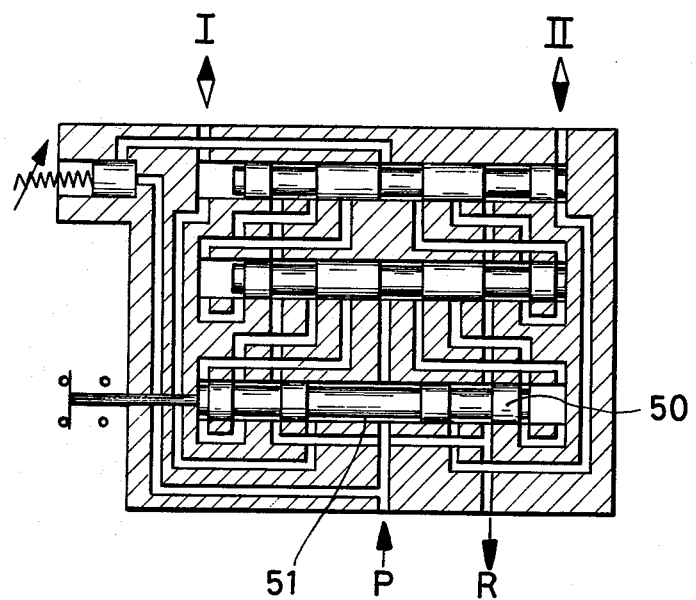
FIG. 12 is a schematic modified 4/2 way valve with a different control piston.

In FIG. 12 a modified embodiment of a 4/2 way valve is illustrated, by which the control piston 50 has a central annular groove 51 which is elongated compared to that of the previously described piston shape. In this manner it can be achieved that in the housing 1, a channel, namely the channel 35 according to FIGS. 1–3 of the drawings, is not required to be formed.

While I have disclosed several embodiments of the present invention, it is to be understood that these embodiments are given by example only and not in a limiting sense.

I claim:

1. A pressure controlled 4/2 way valve, particularly for the alternate control of the feed conduits of two conduit—lubrication systems, comprising
    a housing forming three at least substantially cylindrical spaces and a plurality of channels connecting said cylindrical spaces with one another,
    a piston displaceably mounted in each of said three cylindrical spaces between two end positions of said piston, respectively, said pistons constituting means for the automatic control of a flow medium flowing through said channels and portions of said cylindrical spaces, one of said pistons constituting a control piston disposed in a first of said cylindrical spaces, another of said pistons constituting an auxiliary control piston disposed in a second of said cylindrical spaces, and a third of said pistons constituting a reception piston disposed in a third of said cylindrical spaces,
    a first feed conduit connection and a second feed conduit connection communicating on both ends, respectively, of said third cylindrical space for said reception piston and adapted to be connected to a first and a second feed conduit, respectively,
    a pressurized conduit connection communicating with said channels and adapted to be connected to a pressurized line,
    a pressure relief valve means for hydraulic precontrol being disposed in one of said channels in a path of flow between said pressurized conduit connection and said third cylindrical space for said reception piston,
    said channels include at least two end channels respectively constituting through-flow passages communicating on different sides with each end of each said cylindrical spaces adjacent the respective ends of said pistons, whereby said pistons are supplied on one side and exhausted on the other side of said cylindrical spaces respectively through said two end channels respectively.

2. The 4/2 way valve as set forth in claim 1, further comprising
    a depressurized conduit connection operatively communicating with said channels and adapted to be connected to a depressurized conduit,
    said pistons and said three cylindrical spaces are arranged between said first and second feed conduit connections and said pressurized conduit connection and said depressurized conduit connection, respectively, in the following succession, said reception piston in said third cylindrical space, said auxiliary control piston in said second cylindrical space, and said control piston in said first cylindrical space, respectively,
    each of said pistons is formed with three annular groove portions having a smaller radius than that of a corresponding of said cylindrical spaces forming three annular spaces, respectively, operatively communicating said channels with one another, the latter communicating operatively selective of said three annular spaces of selective of said pistons with that of other of said pistons,
    each of said cylindrical spaces and said pistons cooperatively being formed on opposite face ends thereof with a step forming end portions, respectively, having a radius smaller than that of said corresponding cylindrical space thereby defining end annular spaces in said cylindrical spaces when said piston is in an end position, constituting a common space communicating with said two end channels,
    said two end channels communicating with said cylindrical spaces, respectively, at both ends thereof, respectively, adjacent said end portions, respectively, said steps, said end portions, said pistons and said cylindrical spaces cooperatively form free flow through end spaces at the ends in said cylindrical spaces respectively constituting said annular spaces between said two end channels through which the flow medium can freely pass in any position of said pistons.

3. The 4/2 way valve as set forth in claim 2, wherein said channels include additional channels in said housing formed between and operatively communicate with said third cylindrical space for said reception piston and said second cylindrical space for said auxiliary control piston, on the one hand, and formed between and operatively communicate with said second cylindrical space for said auxiliary control piston and said first cylindrical space for said control piston, on the other hand, said additional channels include in part said at least two end channels, said additional channels operatively communicate with said depressurized conduit connection, whereby static flow medium lubricant zones are prevented.

4. The 4/2 way valve as set forth in claim 3, wherein each of said end channels to said first and second cylindrical spaces relatively, at said both ends thereof, respectively, extends from one end of said each end channel in a plane from another adjacent of said cylindrical spaces to one of said first and second cylindrical spaces adjacent a face end of a corresponding of said pistons disposed in said one cylindrical space, and continues therefrom in the same plane diametrically opposite said one cylindrical space, and returns to said one cylindrical space at another position of the latter adjacent said face end and opens into said free flow through end space thereof, the latter defined by a corresponding end position of said corresponding piston disposed in said one cylindrical space, and said each end channel continues diametrically opposite thereto and opens at another end thereof, adjacent to said one end, into said another cylindrical space, the latter having therein an operatively cycle-wise interconnected of said pistons, such that a cycle-wise communication to said depressurized conduit connection occurs in specific positions of said pistons, a lubricant—supply channel, said additional channels cycle-wise operatively selectively communicate with said end channels via said annular grooves of said pistons and said annular spaces of said cylindrical spaces, and respectively cycle-wise operatively communicate with and continue said lubricant—supply channel via said annular grooves and said annular spaces.

5. The 4/2 way valve as set forth in claim 1, further comprising a movement pointer is secured to one of said pistons and projects from said housing, an end sensor key disposed outside of said housing and operatively adjacent said movement pointer, said movement pointer actuates said end sensor key in a predetermined position of said one piston.

6. The 4/2 way valve as set forth in claim 5, wherein said movement pointer is secured to said control piston.

7. The 4/2 way valve as set forth in claim 1, wherein said pistons are metallically sealingly disposed in said three cylindrical spaces, respectively.

8. The 4/2 way valve as set forth in claim 1, wherein said housing forms a fourth cylindrical space with a determined dosing volume, an additional regulating piston is disposed in said fourth cylindrical space and is operatively interconnected with said reception piston via at least one of said channels and is connected with said first and second feed conduit connections.

9. The 4/2 way valve according to claim 8, further comprising means for closing said first feed conduit connection, whereby said 4/2 way valve is adapted for use as a control valve for an introduction—lubrication system.

10. The 4/2 way valve as set forth in claim 1, further comprising a pressure accumulator connected to said first feed conduit connection, said pressure accumulator defines a cylindrical space, and a pressure—biased accumulator piston disposed in the last-mentioned cylindrical space.

11. The 4/2 way valve as set forth in claim 10, wherein said accumulator piston is spring biased.

12. The 4/2 way valve as set forth in claim 1, further comprising a regulatable dosing means connected to one of said feed conduit connections and defining a dosing space for the flow medium, a separation piston operatively disposed in said dosing space, and an adjustment means cooperating with said separation piston for adjustably limiting the stroke of said separation piston, whereby the 4/2 way valve is adapted for use with automatic filling- and dosing-systems.

13. The 4/2 way valve as set forth in claim 1, wherein said pressure relief valve means is adjustable.

14. A pressure controlled 4/2 way valve, particularly for the alternate control of the feed conduits of two conduit—lubrication systems, comprising a housing forming a first cylindrical space, a second cylindrical space, and a third cylindrical space, three pistons respectively disposed one in each of said cylindrical spaces and constituting a first piston, a second piston and a third piston, respectively, each of said pistons is formed with a plurality of annular grooves and with a step of reduced diameter on each end of said pistons, the pistons being sealingly displaceable in the cylindrical spaces, respectively, said annular grooves of each of said piston constituting a central recess and end recesses disposed spaced apart from said central recess defining central land portions of said piston therebetween of diameter equal to the diameter of said cylindrical space, portions of the pistons between said steps and said end recesses, respectively, constituting end land portions of said pistons of diameter equal to that of said cylindrical space, said piston being slidable back and forth between two end positions in said cylindrical spaces, respectively, said housing being formed with a plurality of channels transversely communicating with said cylindrical spaces at one side of said second and third cylindrical spaces spaced apart at intervals, said channels further including, a pressurized channel extending from a central pressure source extending to said one side of said third cylindrical space communicating with said central recess of said third piston in both end positions thereof, a second channel communicating said central recesses of said second and third pistons in both end positions of said second and third pistons, third channels communicating at said one side of and with said second cylindrical spaced, spaced apart from said second channel and respectively communicating with another side of said third cylindrical space at the ends of the latter, respectively, one of said third channels communicating with said central recess of said second piston and the other of said third channels terminating at one of said central land portions of said second piston in one of the end positions of said second piston, and respectively vice versa in the other end position thereof, fourth channels communicating at said one side of and with said third cylindrical space, spaced apart from said pressurized channel and respectively communicating with one side of said first cylindrical space at the ends of the latter respectively, one of said fourth channels communicating with said central recess of said third piston and the other of said fourth channels terminating at one of said central land portions of said third piston in one of the end positions of said third piston, and respectively vice versa in the other end position thereof, sixth channels spaced apart from each other communicating at said one side of and with said first cylindrical space and respectively communicating with another side of said second cylindrical space at the ends of the latter, respectively, one of said sixth channels terminating at said central land portion of said first piston and the other of said sixth channels communicating with said central recess of said first piston, in both end positions of said first piston, and respectively vice versa in the other end position thereof, a relief channel communicating with one of said end recesses of said third piston in both end positions of the latter, a seventh channel communicating with the other end recess of said third piston in both end positions of said third piston and communicating with said relief channel, a first branch channel communicating with said third cylindrical space disposed between an end of said seventh channel and one end of one of said fourth channels and communicating with the latter, a second branch channel communicating with said third cylindrical space between said relief channel and one end of the other of said fourth channels and communicating with the latter, said first and second branch channels communicating with one of said end recesses respectively of said third piston when said one end of one of said fourth channels terminates at one of said central land portions thereof, and said first and second branch channels terminating at said one of said central land portions of said third piston when said one end of said one of said fourth channels communicates with said central recess thereof and respectively vice versa, four short U-shape end channels disposed at both ends of said second cylindrical space and said third cylindrical space, respectively, each of said end channels having one end thereof communicating with a corresponding said cylindrical space at the remote end thereof at said one side and a second end communicating with one of said end recesses in one end position of a corresponding said piston and with said corresponding cylindrical spaces in front of said step in the other end position thereof, a pair of eighth channels each respectively communicating with one said end recess of said second piston and one said end recess of said third piston, respectively, in both said end positions of both said second and third pistons, a pair of ninth channels each respectively communicating with one said end recess of said first piston and one said end recess of said second piston, respectively, in both said end positions of both said first and second pistons, a relief recess, a tenth channel communicating said pressure channel with said relief recess, an eleventh channel communicating another portion of said relief recess with said first cylindrical space and said central recess of said first piston in both said end positions of the latter, a relief valve disposed in said relief recess, spring means for biasing said relief valve to close communication between said tenth and eleventh channels, a pair of twelfth channels each communicating with one of said end recesses of said second piston in one of the end positions of the latter and terminating at one of said central land portions of said second piston in another of said end positions of the latter and simultaneously reversely with respect to the other of said pair of twelfth channels, said pair of twelfth channels each communicating with said end recess of said third piston in one of the end positions thereof and communicating with said third cylindrical space in front of said step of said third piston in the other end position thereof and simultaneously reversely with respect to the other of said pair of twelfth channels, a pair of thirteenth channels each communicating at one of said end recesses of said first piston in one of the end positions of the latter and terminating at one of said central land portions of said first piston in another of said end positions of the latter and simultaneously reversely with respect to the other of said pair of thirteenth channels, said pair of thirteenth channels each communicating with said end recess of said second piston in one of the end positions thereof and communicating with said second cylindrical space in front of said step of said second piston in the other end position thereof and simultaneously reversely with respect to the other of said pair of thirteenth channels, first and second outlet connections communicating on another side at the ends respectively of said first cylindrical space.

* * * * *

UNITED STATES PATENT AND TRADEMARK OFFICE
CERTIFICATE OF CORRECTION

PATENT NO. : 4,180,090

DATED : December 25, 1979

INVENTOR(S) : Siegfried Bemba

It is certified that error appears in the above-identified patent and that said Letters Patent are hereby corrected as shown below:

Column 10 (Claim 14) Line 62 the word "spaced " (first occurrence) should read --space --

*Signed and Sealed this*

*Twenty-fifth* Day of *March 1980*

[SEAL]

*Attest:*

SIDNEY A. DIAMOND

*Attesting Officer*  *Commissioner of Patents and Trademarks*